No. 752,241. PATENTED FEB. 16, 1904.
J. W. MASTER.
VALVE.
APPLICATION FILED OCT. 29, 1903.
NO MODEL.

Witnesses
Chas. K. Davis.
Lilian Brock

Inventor
James W. Master
by F. B. Brock
Attorney

THE NORRIS PETERS CO., PHOTO-LITHO., WASHINGTON, D. C.

No. 752,241. Patented February 16, 1904.

UNITED STATES PATENT OFFICE.

JAMES WILLIAM MASTER, OF LOS ANGELES, CALIFORNIA.

VALVE.

SPECIFICATION forming part of Letters Patent No. 752,241, dated February 16, 1904.

Application filed October 29, 1903. Serial No. 179,040. (No model.)

*To all whom it may concern:*

Be it known that I, JAMES WILLIAM MASTER, of Los Angeles, county of Los Angeles, and State of California, have invented certain new and useful Improvements in Valves; and I do hereby declare the following to be a full and clear description thereof.

My invention relates to valves.

The invention consists in the following construction and combination of parts, the details of which will first be fully described and the features of novelty then set forth and claimed.

Figure 1:
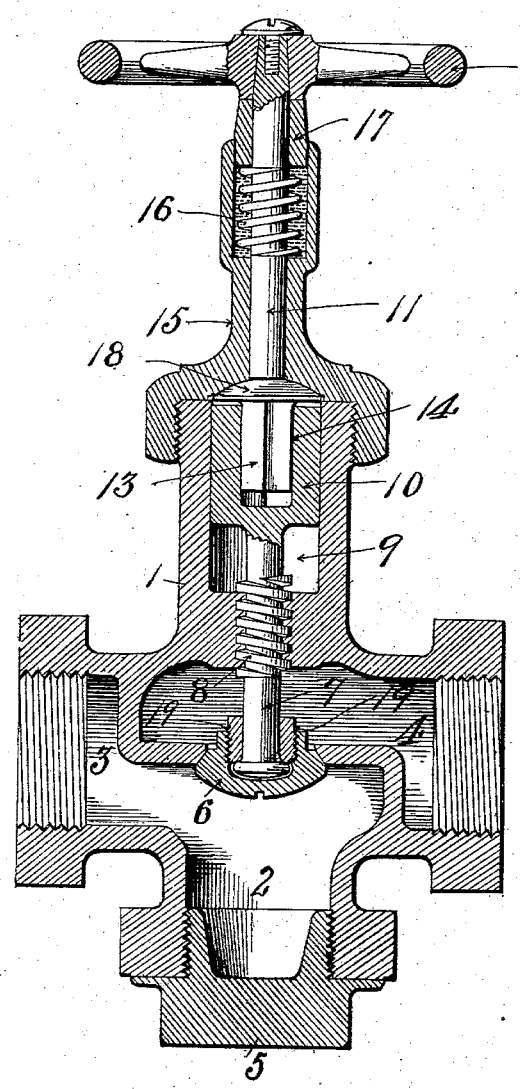
Figure 2:
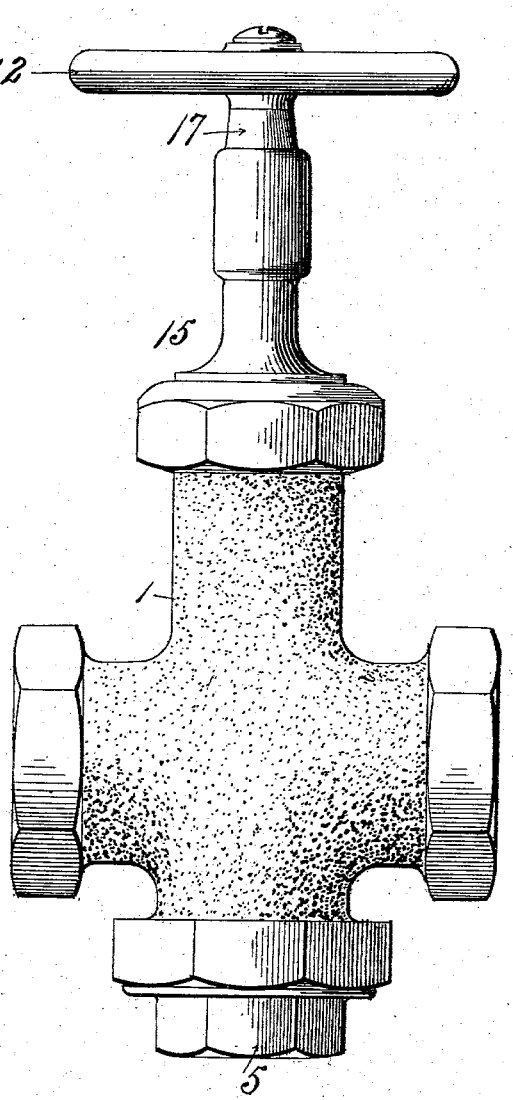

Figure 1 represents a longitudinal central section of a valve to which I have applied my improvements. Fig. 2 is an exterior view of the same.

In the drawings, 1 represents the valve shell or casing, provided with a series of ports 2, 3, and 4. All of these ports or openings are of the same size and correspondingly threaded.

5 is a screw-plug having threads corresponding to ports 2, 3, and 4 and is adapted to fit and close any one of said ports or openings.

The valve-seat is formed in the casing in the usual way, in which is seated a valve 6, having a universal connection with the valve-stem 7. Stem 7 is provided with a thread 8, entering a corresponding threaded recess in the valve-casing. In the top of the valve-casing is an enlarged chamber 9, and the upper portion of the stem 7 is enlarged in the form of a bearing 10, fitting and sliding in the cylindrical opening 8.

Loosely fitting in the upper end of the bearing 10 is the stem 11 of the valve-wheel, lever, or handle 12, the lower end 13 of which stem is angular in cross-section and adapted to fit a corresponding angular axial opening 14 in the bearing 10 of valve-stem 7.

The upper portion 15 of the valve-casing is united to the main casing by a screw-joint, the upper end being enlarged somewhat and shouldered to receive a spring 16. 17 is a sleeve loosely formed on stem 11 and interposed between the handle 12 and the spring. The valve-cap or upper extension 15 is recessed to form a semispherical seat, within which a partly-spherical collar 18, rigid with the stem 11, fits fluid-tight.

The lower end of valve-stem 7 is rounded somewhat to form a member of a ball-joint. A two-part exteriorly-threaded sleeve 19 embraces the lower end of the stem 7 and is provided with a bearing corresponding with the end of the stem. The valve proper, 6, is also provided with a recess which takes the ball-joint connection with the valve-stem and is threaded upon the sleeve 19. A certain lateral or universal play is permitted to the valve 6 upon the stem 7 and serves to prevent binding or imperfect seating of the valve in its seat.

The rotation of the upper stem 11 is not accompanied by the usual vertical movement of the stem, as in the valves of the ordinary type. Stem 11, through the angular slidable connection between it and the main valve-stem, serves to rotate the latter by means of the thread 8 upon the stem 7, thereby moving the valve 6 to and from its seat. The space which the spiral spring 16 occupies is adapted to be filled with a lubricant and serves for the proper lubrication of the parts of the valve, needing renewal only at long intervals. The spherical head 18 on the stem 11, seating in the corresponding socket in the upper casing 15, forms a fluid-tight joint, thereby preventing any leakage through the handle end of the valve. The closing of this joint is effected by the pressure in the valve passing up along the stem and into the large opening 9 and up through the same against the under side of the spherical collar 18. It is also assisted by the pressure of the spring 16 acting to pull the spherical collar into close contact with its seat. The screw-plug 5 may be removed from the opening 2 and interchangeably fitted in the opening 3, which would have the effect of changing the valve from a straight-line connection to an L or valve placed at a right angle in a line of piping, or the screw-plug 5 may be removed from the opening 2 and placed in the opening 4. By the word "plug" is meant also a cap or cover.

As shown and described my invention comprises a reversible valve and also a valve having a fluid-tight stem without packing.

Various expressions may be given the inventive act other than those exemplified in the drawings, the drawings serving in this instance as an illustration of one detailed form of carrying out the invention. Any other variation of the invention which comes within the claim is intended to be protected thereby.

What I claim, and desire to secure by Letters Patent, is—

A valve-casing provided with three openings angularly disposed, a plug common to all three openings and adapted to be interchangeably moved from one to the other of the openings within the casing.

In testimony whereof I have affixed my signature in the presence of two witnesses.

JAMES WILLIAM MASTER.

Witnesses:
W. B. SCARBOROUGH,
W. P. BATTELL.